United States Patent
Wood et al.

(10) Patent No.: US 9,096,109 B2
(45) Date of Patent: Aug. 4, 2015

(54) UNITIZED HYDRAULIC SUSPENSION SYSTEM

(71) Applicant: ASPEN CUSTOM TRAILERS, Richmond (CA)

(72) Inventors: Ron Wood, Langley (CA); Sean Jullion, Edmonton (CA)

(73) Assignee: ASPEN CUSTOM TRAILERS, Richmond (CA)

( * ) Notice: Subject to any disclaimer, the term of this patent is extended or adjusted under 35 U.S.C. 154(b) by 48 days.

(21) Appl. No.: 13/914,259

(22) Filed: Jun. 10, 2013

(65) Prior Publication Data

US 2013/0270788 A1 Oct. 17, 2013

(30) Foreign Application Priority Data

Apr. 19, 2013 (CA) ..................................... 2813870

(51) Int. Cl.
| | |
|---|---|
| *B60G 5/04* | (2006.01) |
| *B62D 53/06* | (2006.01) |
| *B60G 5/01* | (2006.01) |
| *B60G 3/02* | (2006.01) |
| *B60G 5/00* | (2006.01) |

(52) U.S. Cl.
CPC .. *B60G 5/04* (2013.01); *B60G 3/02* (2013.01); *B60G 5/00* (2013.01); *B60G 5/01* (2013.01); *B62D 53/06* (2013.01); *B60G 2200/10* (2013.01); *B60G 2200/44* (2013.01); *B60G 2300/0262* (2013.01)

(58) Field of Classification Search
CPC .............. B60G 5/00; B60G 5/01; B60G 5/02; B60G 5/04; B60G 11/23; B60G 11/27; B60G 11/44; B60G 3/02; B60G 2200/44; B60G 2200/10; B60G 2300/0262; B62D 53/06; F16F 13/14
USPC .................. 280/676, 677, 678, 682, 124.116; 267/276, 279, 292, 140.12
See application file for complete search history.

(56) References Cited

U.S. PATENT DOCUMENTS

| | | | |
|---|---|---|---|
| 3,831,961 A * | 8/1974 | Peller | 280/81.6 |
| 4,202,564 A * | 5/1980 | Strader | 280/678 |
| 4,373,744 A | 2/1983 | Glaze | |
| 4,530,515 A * | 7/1985 | Raidel | 280/86.5 |
| 4,699,399 A | 10/1987 | Jable et al. | |
| 5,944,339 A * | 8/1999 | McKenzie et al. | 280/678 |
| 6,916,037 B2 * | 7/2005 | Baxter et al. | 280/683 |
| 6,942,232 B1 | 9/2005 | McGhie | |
| 7,055,831 B2 | 6/2006 | Brandenburger | |
| 7,077,411 B2 * | 7/2006 | Peters et al. | 280/124.132 |
| 7,178,824 B2 * | 2/2007 | Ziech | 280/678 |
| 7,669,865 B2 | 3/2010 | Mollhagen | |
| 2001/0013691 A1 | 8/2001 | Hosoya | |
| 2002/0067017 A1* | 6/2002 | Keeler et al. | 280/124.128 |

(Continued)

*Primary Examiner* — Faye M Fleming
(74) *Attorney, Agent, or Firm* — Christie, Parker & Hale, LLP

(57) ABSTRACT

A unitized hydraulic suspension system for a tandem front and back two-axle group comprises two pivoting arms, each for supporting one of the two axles, arranged on opposite sides of a common rigid hanger. Each arm is attached to one end of a respective cylinder the other end of which cylinder is attached to the common hanger. The unitized hydraulic suspension simplifies the use of hydraulic suspension in dual laning heavy haul applications by the provision of a slide assembly in which unitized hydraulic suspensions are slidably mounted so as to be extendible or retractable in relation to one another.

4 Claims, 23 Drawing Sheets

(56) References Cited

U.S. PATENT DOCUMENTS

| | | |
|---|---|---|
| 2003/0151224 A1 | 8/2003 | Woody et al. |
| 2006/0192361 A1 | 8/2006 | Anderson et al. |
| 2006/0273540 A1 | 12/2006 | Heron et al. |
| 2007/0262549 A1 | 11/2007 | Haerr et al. |
| 2007/0262552 A1 | 11/2007 | Sutton et al. |
| 2009/0273159 A1 | 11/2009 | Sutton |
| 2011/0057407 A1 | 3/2011 | Noble |
| 2011/0148065 A1 | 6/2011 | Hata |

\* cited by examiner

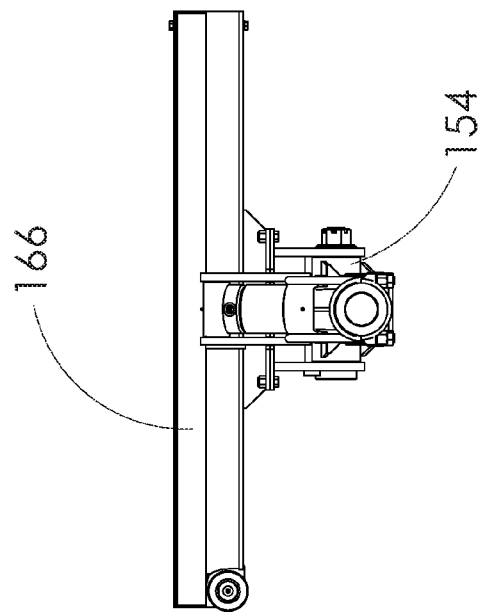
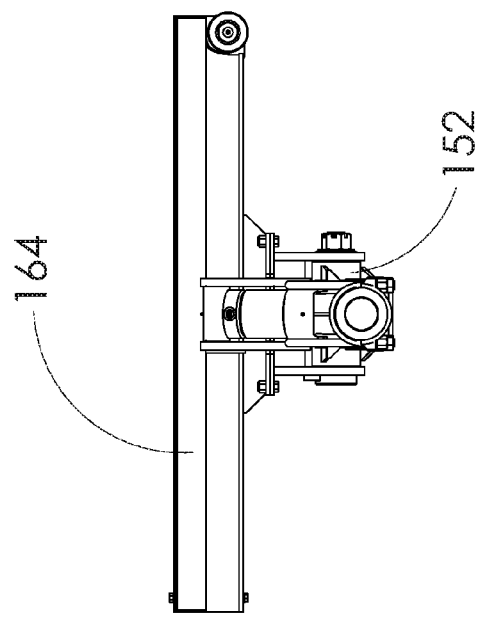
Fig. 11

UNITIZED HYDRAULIC SUSPENSION SYSTEM

CROSS-REFERENCE TO RELATED APPLICATION

This application claims the priority to and benefit of Canadian Patent Application No. 2,813,870, Apr. 19, 2013, the contents of which are hereby expressly incorporated by reference.

FIELD OF THE INVENTION

This invention relates to heavy haul multi-axle transport vehicles. In particular, this invention relates to suspension systems for such vehicles.

BACKGROUND OF THE INVENTION

Known suspension systems typically used in North America for multi-axle heavy haul trailer applications include air ride suspensions, leaf spring-based systems and walking beam systems.

FIGS. 1 and 2 show another type of prior art suspension system, commonly known as a pendulum type hydraulic suspension, and that is sometimes used in heavy haul applications. In a pendulum type hydraulic suspension, the axle 10 pivots about a lower arm 12 that is in turn pivoted in relation to an upper arm 14 about a pivot pin 16. The upper arm 14 depends from a turntable plate 18 that rotates about a centre axis allowing the suspension assembly and its captive axle to rotate in relation to the frame of the trailer. A hydraulic cylinder 20 extends from the turntable plate 18 to the lower arm 12, the cylinder being located between the pivot pin 16 and the axle 10. Such a prior art system is also exemplified in FIG. 4 of U.S. Pat. No. 6,942,232 to McGhie.

In multi-axle trailers, each axle is independently suspended by its own pendulum type suspension. Equalization between the axles of an axle group tends to rely on fluid exchanges between the cylinders of the independent suspensions of the axle group. As one of the axles goes over a bump, the cylinder is compressed and the fluid moves to one or more other cylinders to support the load on the other axles. Equalization in pendulum type hydraulic suspensions can be more effective than in walking beam or air ride suspensions.

A disadvantage of this arrangement is that the location of the cylinder, being attached between the pivot point (the pivot pin) and the axle, does not provide the maximum possible mechanical advantage. The lack of an ideal mechanical advantage is compensated by providing more powerful cylinders. On the other hand, the system offers the advantage of providing the maximum effect for a minimum amount of piston stroke, since the cylinder is relatively close to the pivot point.

Independent hydraulic suspensions are sometimes used in heavy haul applications but not frequently so. However, they do offer the flexibility that is often needed in designing heavy haul applications that require various spacing between axles and axle groups.

Some jurisdictions, such as in the United States, allow what is known as "dual lane loading" for heavy haul vehicles. Dual lane loading allows the load to be spread over two lanes of a road using axles that extend across up to two lanes. This effectively increases the total weight allowance. In the prior art, dual lane loading is sometimes achieved by using walking beam types of suspensions and hydraulically telescoping the axles outward or inward as needed. When necessary, for example to cross a narrow bridge, the axles are telescoped inward to a narrower configuration and are brought back out for continued travel.

The applicant understands that telescoping of pendulum type independent hydraulic suspensions to achieve dual lane loading has been considered by some. However, telescoping the various hydraulic suspensions along with their captive axles and coordinating their movement is difficult. The practical resolution to the problem has been to provide systems wherein the hydraulic suspensions are unbolted, spacers or connectors are added or removed and the suspensions are re-bolted into a narrower or a wider configuration as the case may be. Such an approach is also exemplified in US Patent Publication No. 2009/0273159 (Sutton). It will be appreciated that that approach is unwieldy and time consuming.

It is therefore an object of this invention to provide a heavy haul vehicle that uses pendulum type hydraulic suspensions that is better suited for use with a telescoping system for accommodating dual lane loading applications.

These and other objects of the invention will be better understood by reference to the detailed description of the preferred embodiment which follows. Note that not all of the objects are necessarily met by all embodiments of the invention described below or by the invention defined by each of the claims.

SUMMARY OF THE INVENTION

In one aspect, the invention is a unitized hydraulic suspension system for a two-axle tandem (front and back) axle group used in a heavy-haul transport vehicle. Two pivoting arms, each for supporting one of the two axles, are arranged on opposite sides of a common hanger structure. Each of the arms is attached to one end of a respective hydraulic cylinder the other end of which cylinder is attached to the common hanger in an opposed front and back arrangement across the hanger.

In another aspect, the hanger comprises a pivot mounting structure on which the pivoting arms are pivotally mounted and the front and back arrangement may be defined in relation to a vertical central axis of the pivot mounting structure.

In a further aspect, the pivot arms define pivot axes and the top ends of the two cylinders are secured to a common rigid structure above the pivot axes.

In another aspect, the invention comprises a dual-laning hydraulic suspension system. The system comprises at least two side by side unitized hydraulic suspension systems slidably mounted in relation to one another.

In one aspect, the unitized hydraulic suspension systems are mounted in relation to a slide assembly enabling the unitized hydraulic suspension systems along with their supported axles to be selectively repositioned in a retracted or an extended relationship to each other by sliding the unitized suspension systems in relation to the slide assembly.

In a further aspect of the dual laning hydraulic suspension system, each of said at least two tandem hydraulic suspension systems is mounted to a mounting beam structure. The slide assembly comprises a slide box assembly and the mounting beam structure is engaged within the slide box assembly. At least one hydraulic cylinder actuates sliding movement of the mounting beam structures in relation to the slide box assembly.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The invention will be described by reference to the detailed description of the preferred embodiment and to the drawings thereof in which:

FIG. 11 is a front elevation of the system of FIG. 10 but wherein the wheels, axles and the slide box assembly have been omitted;

DETAILED DESCRIPTION OF THE PREFERRED EMBODIMENT

Figure 1:
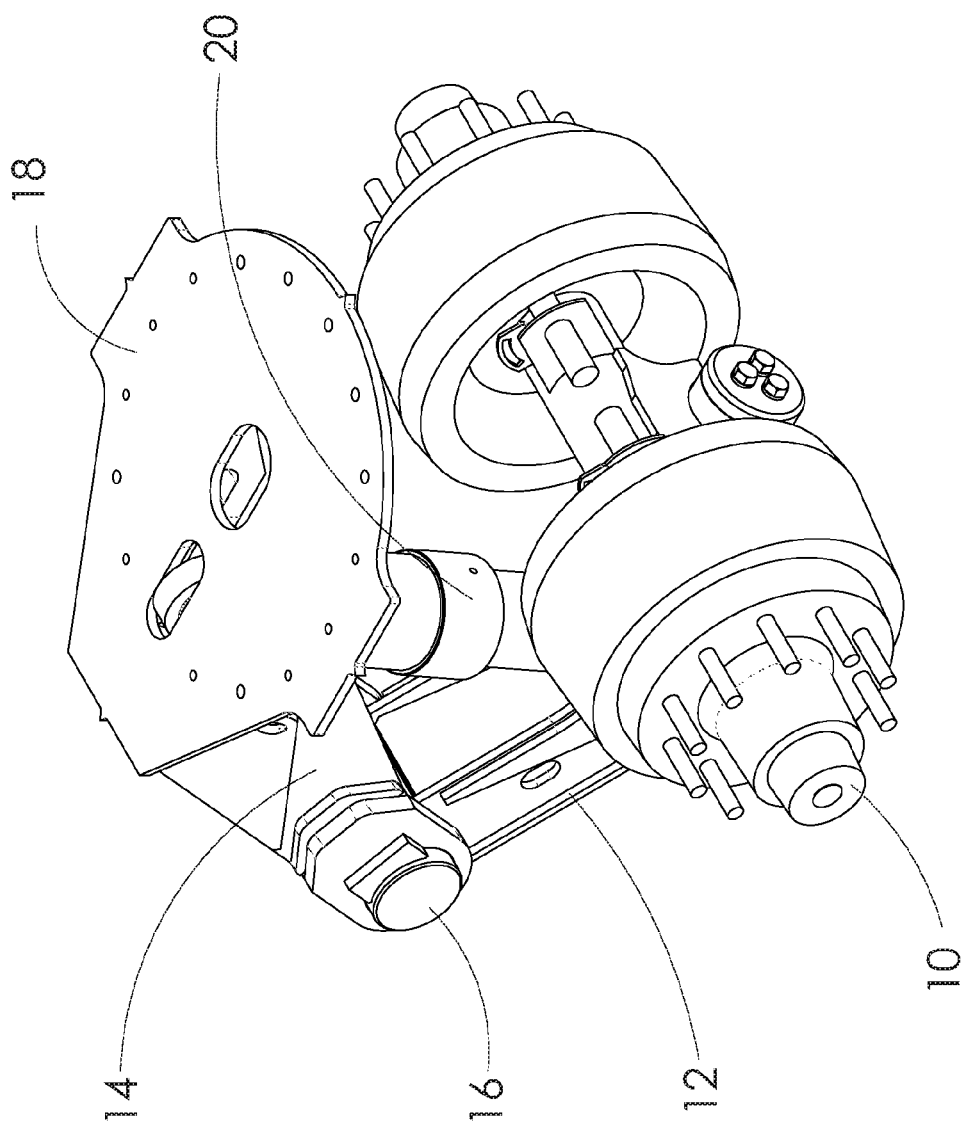
FIG. 1 is a perspective view of a prior art hydraulic suspension.
Figure 2:
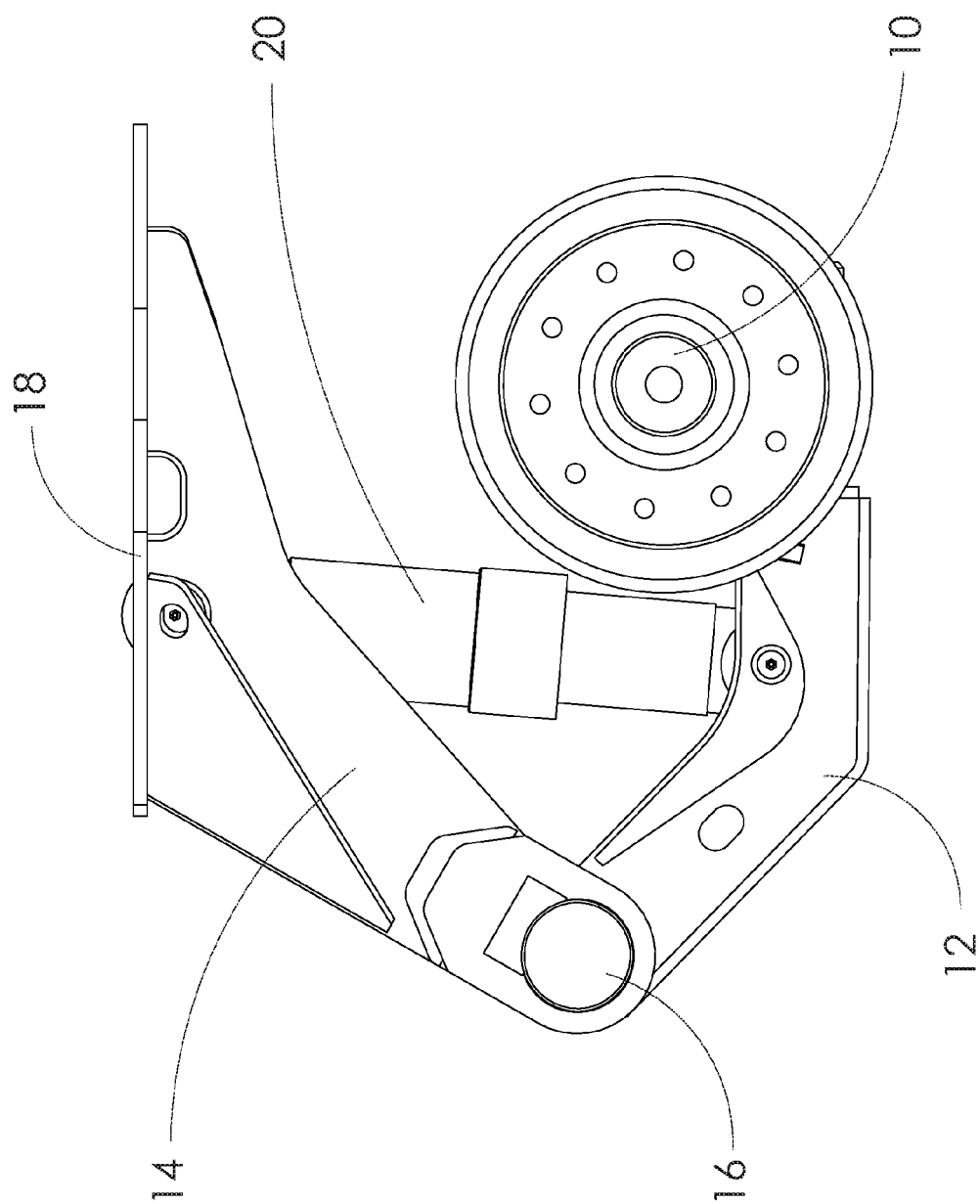
FIG. 2 is a side elevation of the suspension of FIG. 1.
Figure 3:
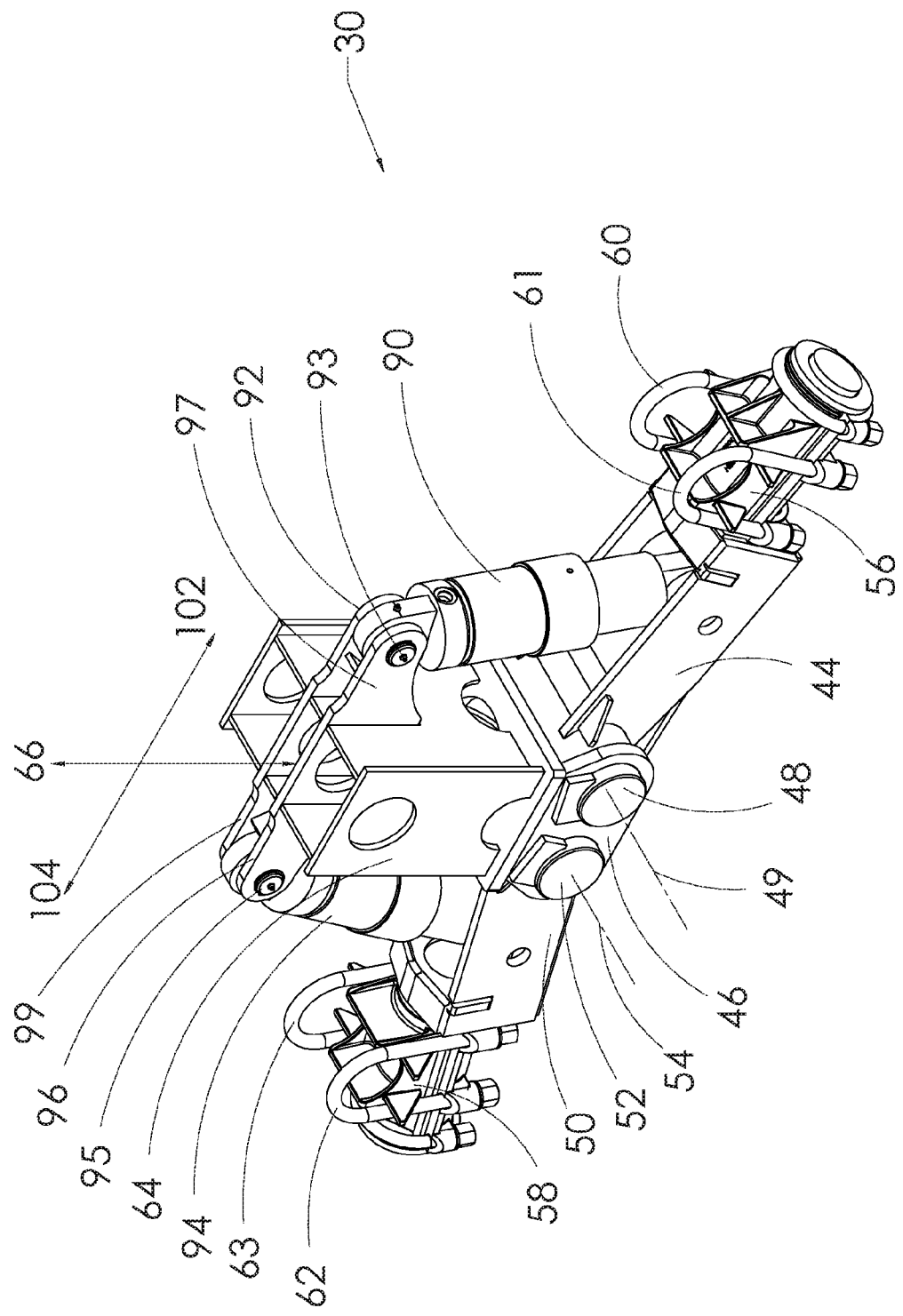
FIG. 3 is a perspective view of the preferred embodiment of a unitized tandem hydraulic suspension according to the invention, with the axles and wheels removed for clarity.
Figure 3A:
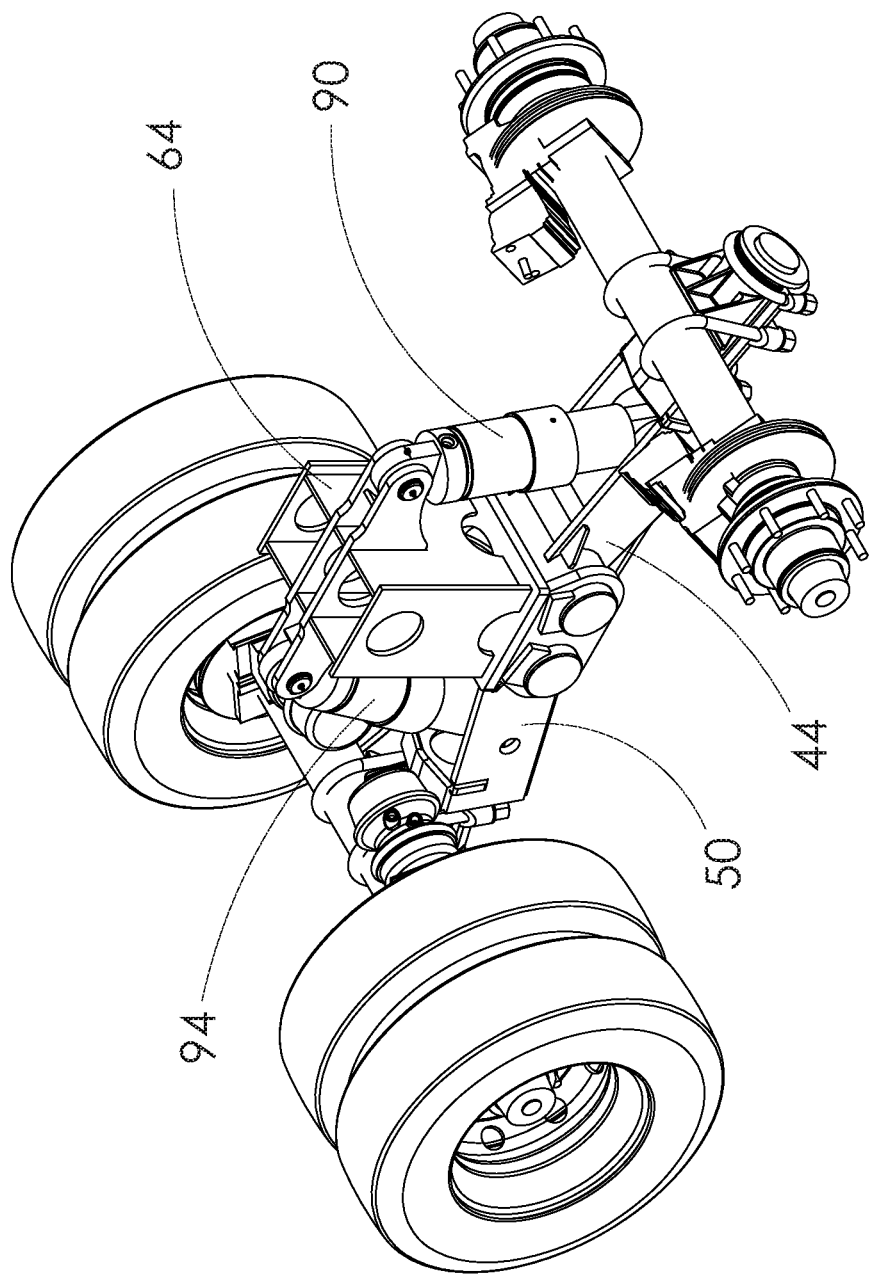
FIG. 3A is a perspective view of the suspension of FIG. 3, but including axles and one of the two sets of four wheels.
Figure 4:
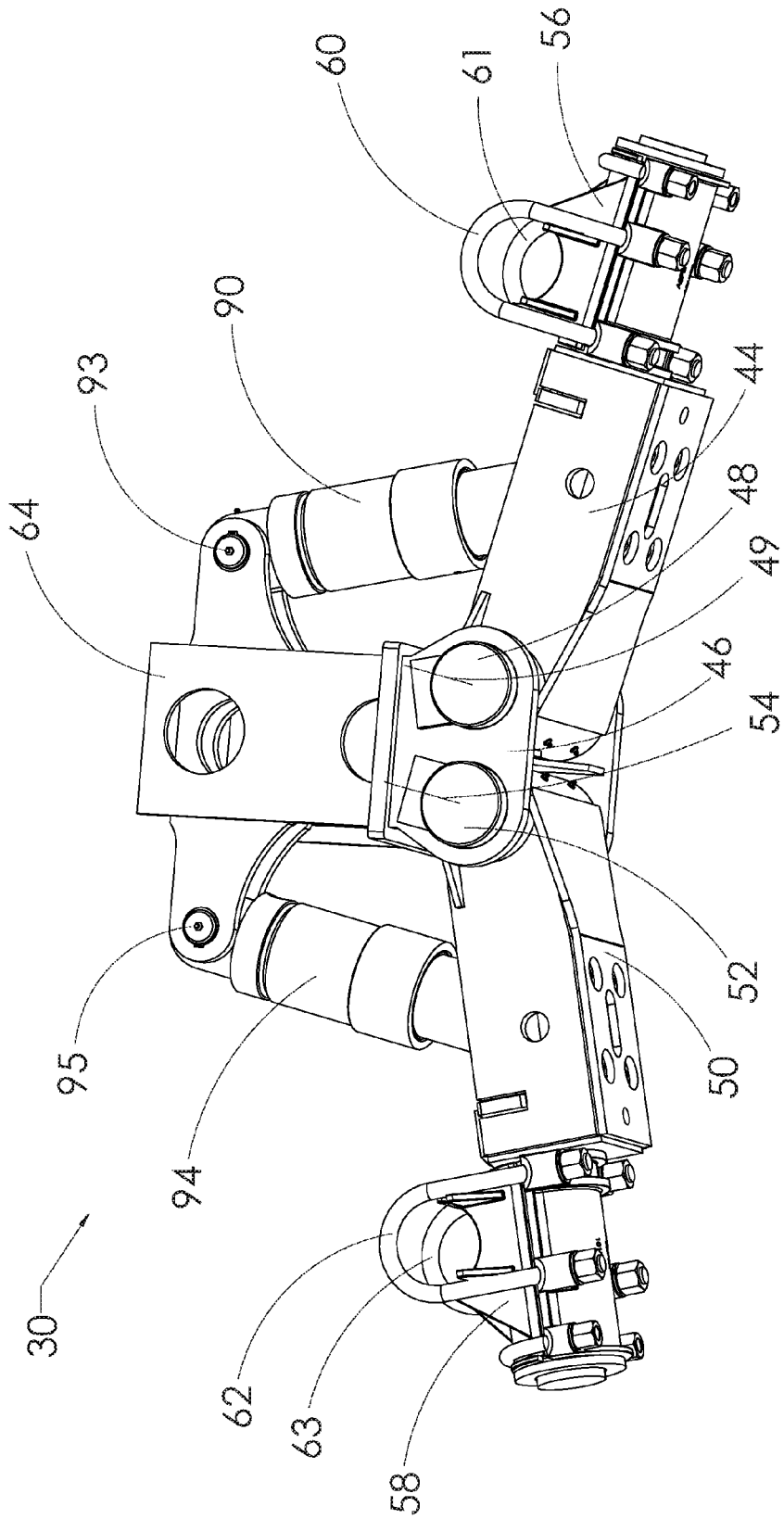
FIG. 4 is a bottom and side perspective view of the suspension of FIG. 3.
Figure 5:
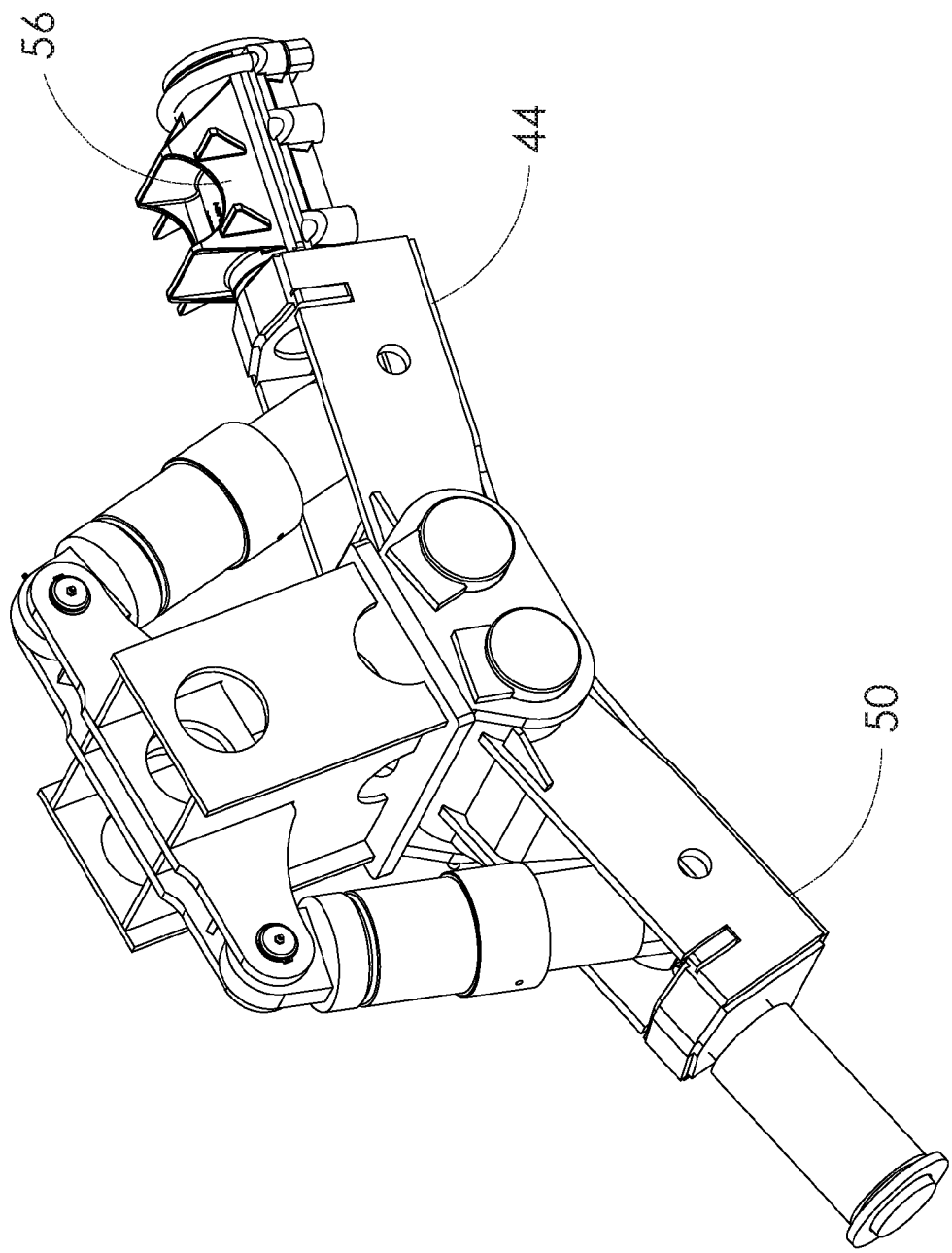
FIG. 5 is a perspective view of the suspension of FIG. 3 with the axle mount removed to show an extended portion of the lower arm.

FIGS. 3 and 3A illustrate the unitized hydraulic suspension system 30 according to a preferred embodiment. FIG. 3A is a view similar to that of FIG. 3 but shows front 32 and rear 34 axles and four of the wheels 36, 37, 38 and 39.

The front axle 32 is supported by a front support arm 44 that is pivoted about a pivot mounting member 46. A front pivot pin 48 defines a forward pivot axis 49 for the front support arm 44. A rear axle 34 is supported by a rear support arm 50 that is also pivoted about the same pivot mounting member 46. A rearward pivot pin 52 defines a rear pivot axis 54 for the rear support arm 50. Each of the front and rear support arms 44, 50 includes an axle mount comprising in this embodiment axle saddle brackets 56, 58 and U-bolts 60, 61, 62 and 63 for retaining the axles 32, 34 on the support arms 44, 50.

The suspension system supports a tandem axle arrangement with a front axle 32 leading a rear axle 34 (in this specification and in the claims, "tandem" refers to a front and back or fore and aft arrangement). The suspension system is used in a multi-axle heavy haul transport vehicle that will typically include a number of unitized hydraulic tandem suspension systems according to the invention.

A rigid hanger member 64 extends above the pivot mounting member 46, generally along a central vertical axis 66 of the pivot mounting member 46. It is contemplated that in some embodiments, the pivot mounting member 46 and the rigid hanger 64 may consist of a unitary construction. However in the preferred embodiment, the hanger 64 is a separately definable structure but that is permanently secured to the pivot mounting member 46 and the hanger member 64 may itself comprise several plates and cross members as discussed in more detail below.

A front hydraulic cylinder 90 has a first end 92 secured at a point at one side of the hanger 64 and a rear hydraulic cylinder 94 has a first end 96 secured at the opposite side of the hanger 64. The first ends 92, 96 of both the front and rear cylinders 90, 94 are attached to the same hanger 64. In the preferred embodiment, the first ends 92, 96 front and rear hydraulic cylinders 90, 94 are attached by cylinder pins 93, 95 to cylinder lug brackets 97, 99 that are integrated into the rigid hanger structure 64. The front and rear cylinders are therefore attached at opposed front and back positions 102, 104 in relation to the vertical central axis 66 of the pivot mounting member 46. The upper ends 92, 96 of the front and rear cylinders are attached at points above the pivot axes 49, 54 of the support arms.

The piston of the front cylinder 90 is attached to the front support arm 44 while the piston of the rear cylinder 94 is attached to the rear support arm 50.

In this arrangement, the front cylinder 90 extends forwardly and downwardly from its attachment point to the rigid hanger 64 to connect to the front support arm 44 while the rear cylinder 94 extends rearwardly and downwardly from its attachment point to the rigid hanger to connect to the rear support arm 50.

Figure 6:
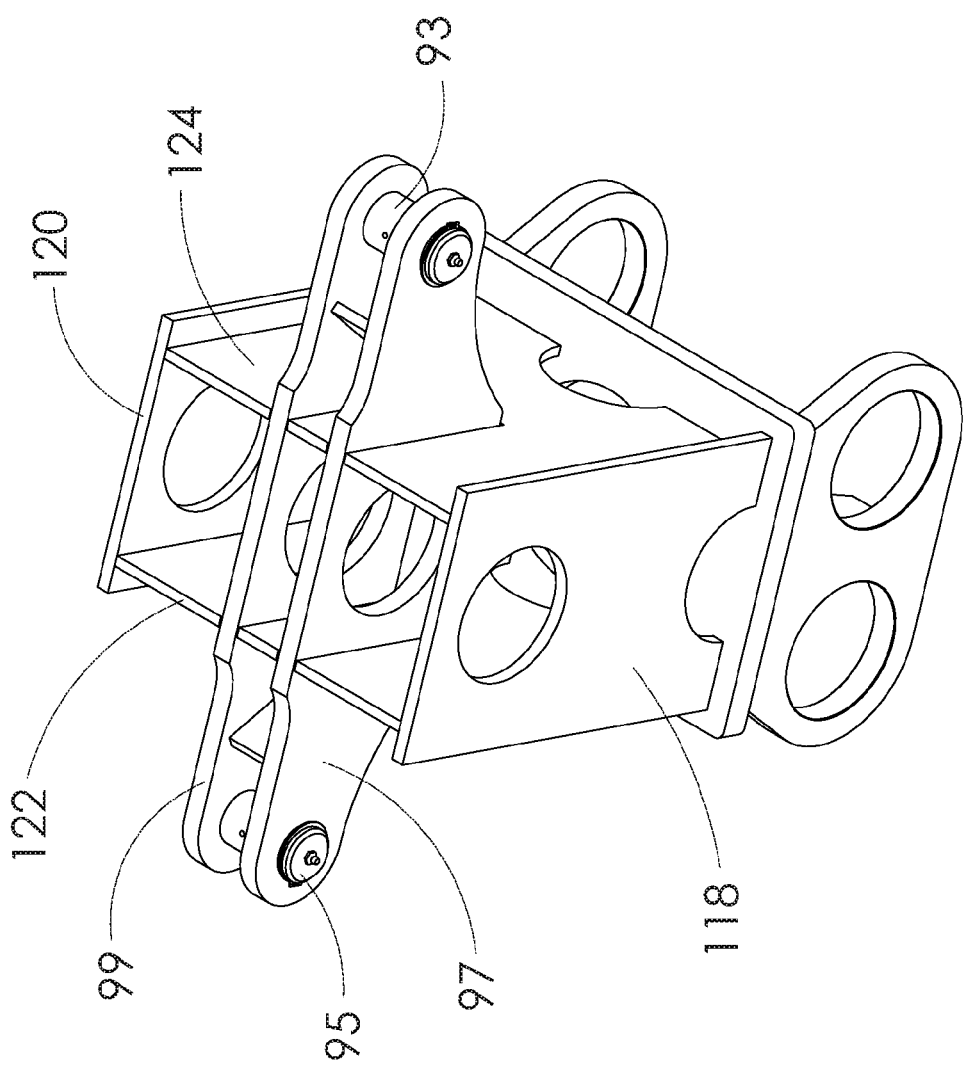
FIG. 6 is a top and side perspective view of the hanger member and the pivot mounting member of the preferred embodiment.

Referring to FIG. 6, the hanger structure comprises two end plates 118, 120, two side plates 122, 124 and two spaced parallel cylinder lug brackets 97, 99 extending across the two end plates and that are attached to one another by the cylinder pins 93, 95.

Figure 7:
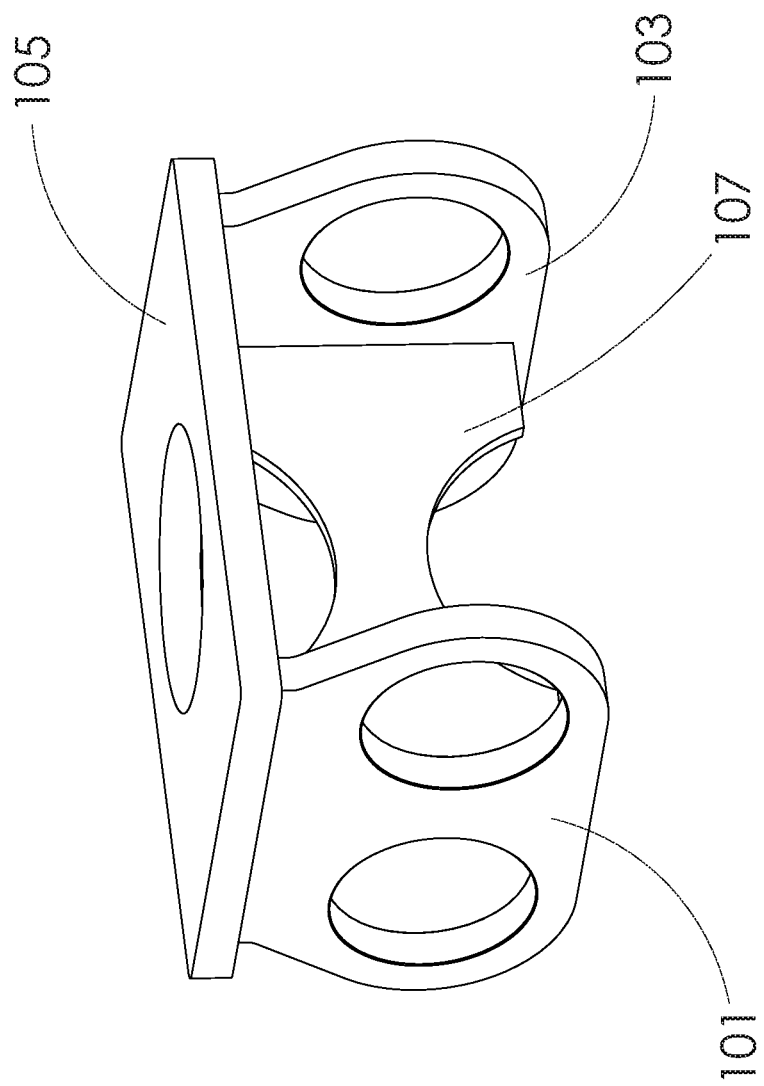
FIG. 7 is a perspective view of the pivot mounting member of the preferred embodiment.

The pivot mounting member 46 is shown in isolation in FIG. 7. It comprises two end brackets 101. 103 and a spanning brace 107. The spanning brace 107 is disposed between four apertures 109, 111, 113 and 115 in the end plates, those apertures being sized to receive the pivot pins 48, 52.

Figure 8:
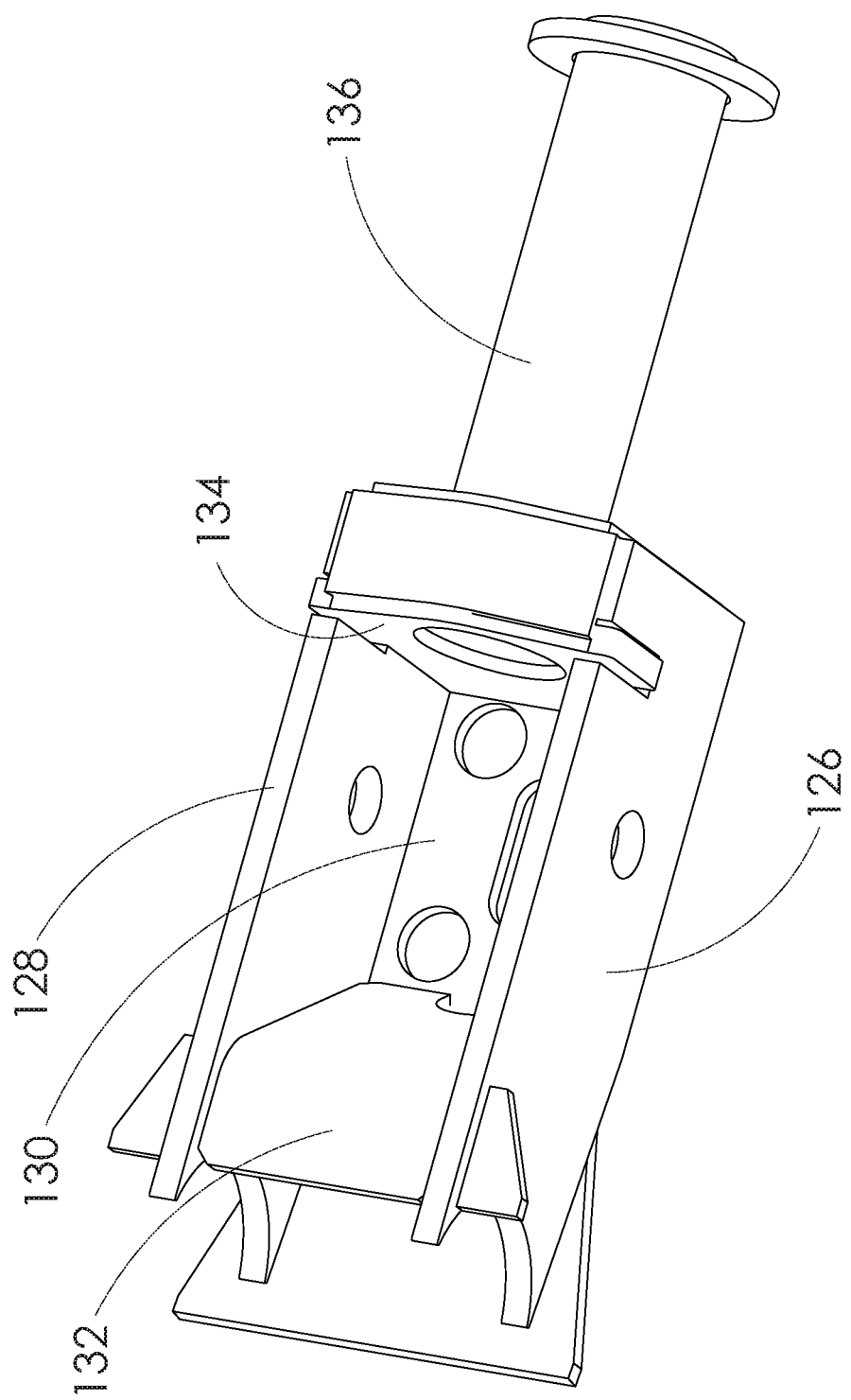
FIG. 8 is a top perspective view of a support arm of the preferred embodiment.

Referring to FIG. 8, each of the support arms comprises two side wall plates 126, 128, a bottom plate 130 and a diagonal brace plate 132. A bushing housing 134 is provided at a distal end of the side walls 126, 128 to hold a bushing 136 allowing the axle to pivot about the bushing 136.

Figure 10:
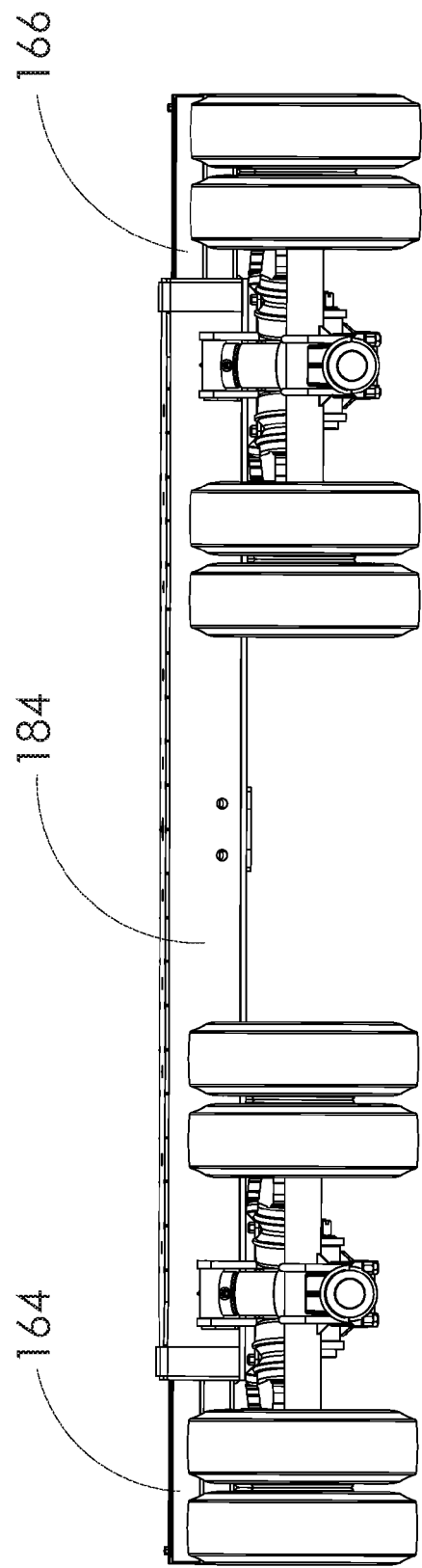
FIG. 10 is a front elevation of the alternative embodiment of the invention showing two side by side unitized hydraulic suspensions, part of their respective mounting beam structures and the slide box assembly.
Figure 10A:
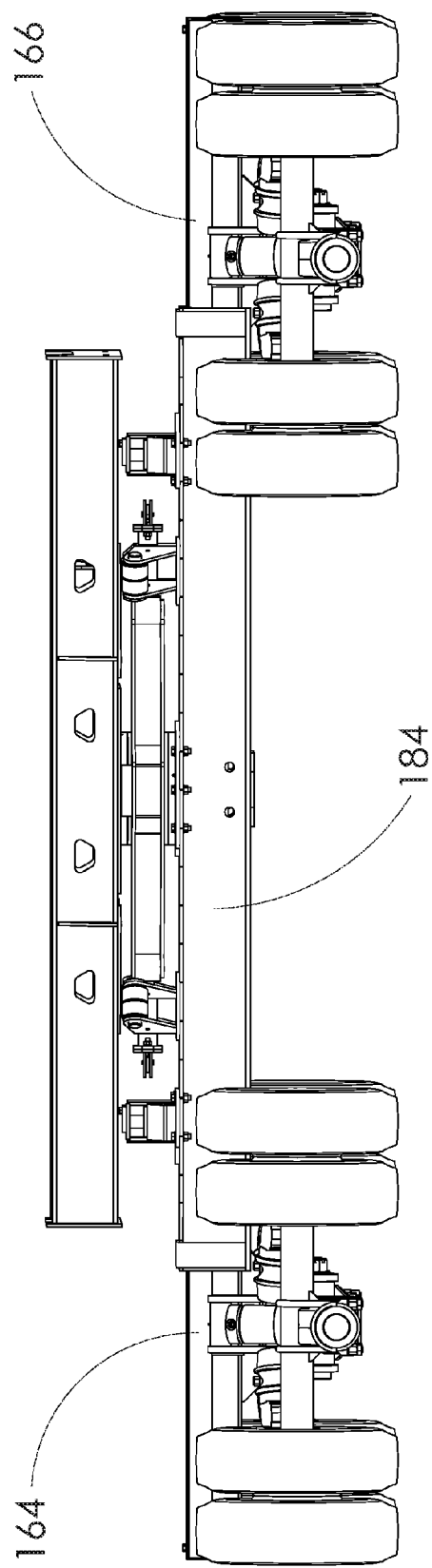
FIG. 10A is a view similar to FIG. 10 but including the turntable and coupler for steering the assembly of the alternative embodiment.

FIGS. 10 and 10A illustrate an alternative 16-wheel embodiment of the unitized hydraulic suspension system having two side by side unitized hydraulic suspension systems supporting co-linear sets of axles to effect dual lane loading. FIG. 10 shows the wheel groups, parts of the mounting beam structures 164, 166 for each unitized hydraulic suspension and a slide box assembly 184 along which the mounting beam structures slide to reposition the wheel groups in an extended or a retracted position in relation to one another. In FIG. 10, the wheel groups are in a retracted position. FIG. 10A includes the turntable 200 that allows the entire 16-wheel assembly to be turned. In FIG. 10A, the 8-wheel groups are in relative extended position in relation to FIG. 10.

Figure 9:
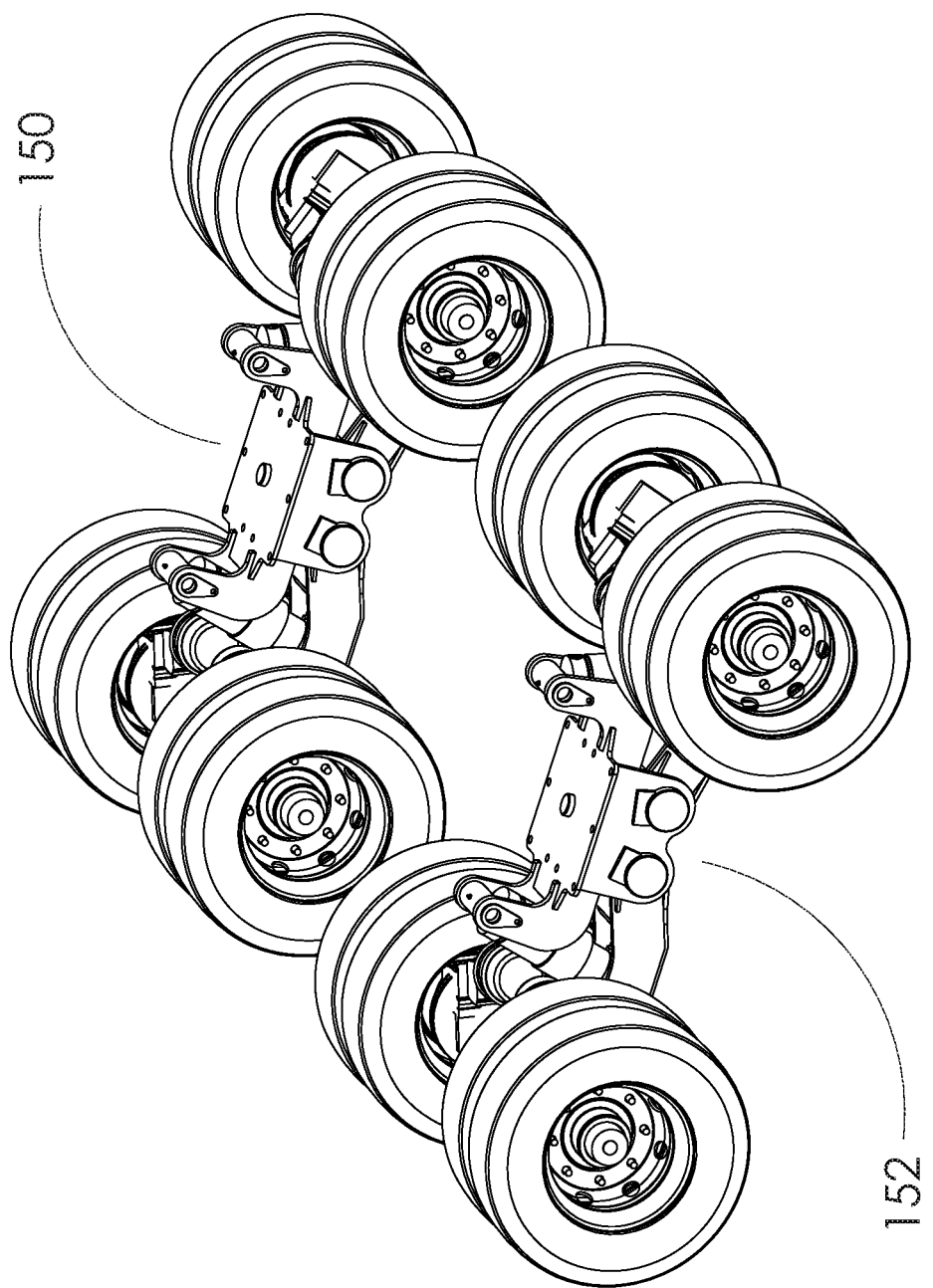
FIG. 9 is a perspective view of two unitized hydraulic suspensions according to an alternative embodiment of the invention, in which the mounting beam structures for each suspension and the slide box assembly for receiving the two mounting beam structures are omitted.

FIG. 9 is intended to show the relative placement of the two unitized suspension systems 150, 152 in the 16-wheel dual laning embodiment and accordingly the figure does not show the mounting beam structures 164, 166 for each suspension system or the connecting slide box assembly 184 for connecting the two mounting beam structures 164, 166.

Generally speaking, each of the two unitized suspensions is mounted to a mounting beam structure 164 or 166. The mounting beam structure 164, 166 slide within a slide box assembly 184 allowing for the retraction or extension of the mounting beam structures 164, 166 in relation to one another, so as to retract or extend the unitized suspension systems 150, 152 in relation to one another for the dual lane loading transition.

FIG. 11 shows the two side by side unitized hydraulic suspensions mounted on their respective mounting beam structures, but without the slide box assembly, the wheels or the axles for clarity.

Figure 12:
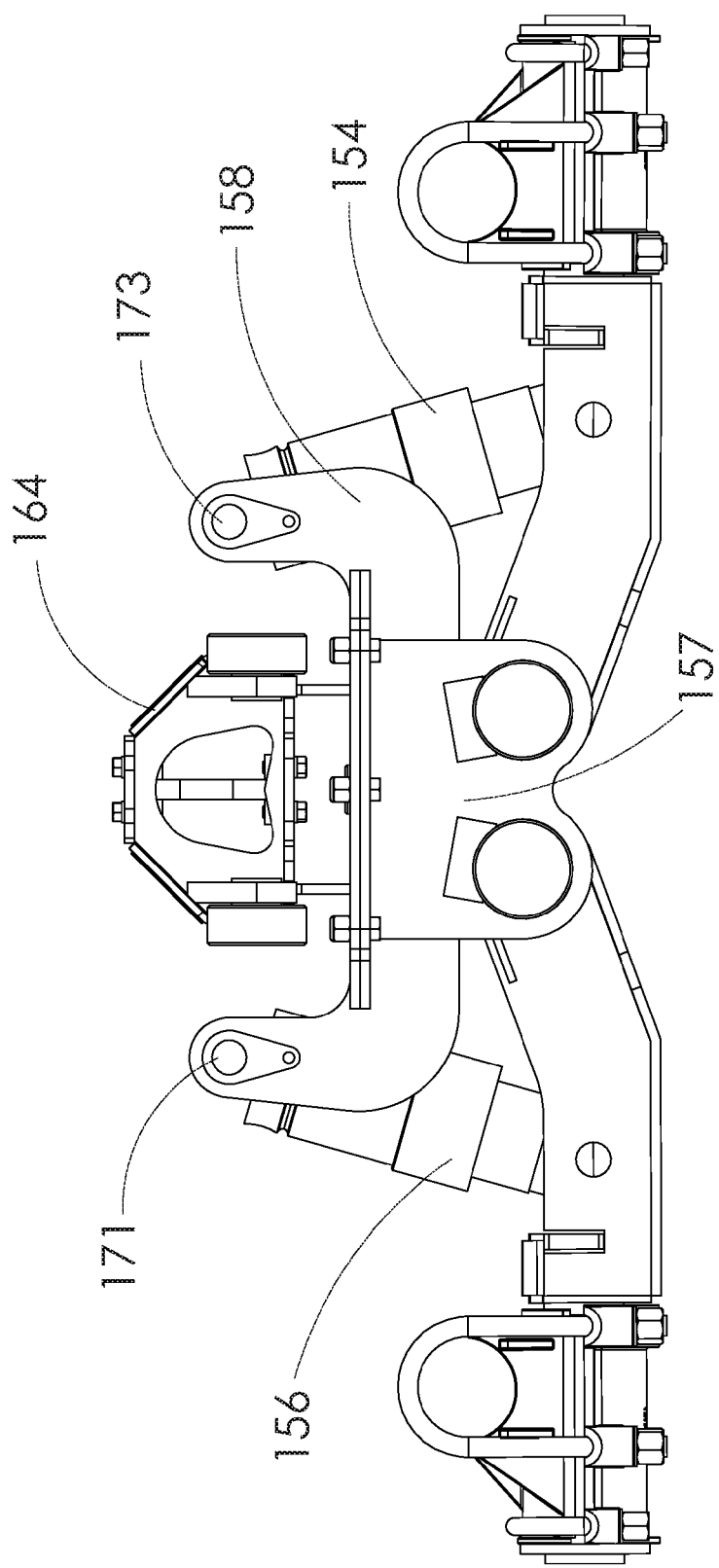
FIG. 12 is a side elevation of one of the unitized hydraulic suspensions of the alternative embodiment.
Figure 13:
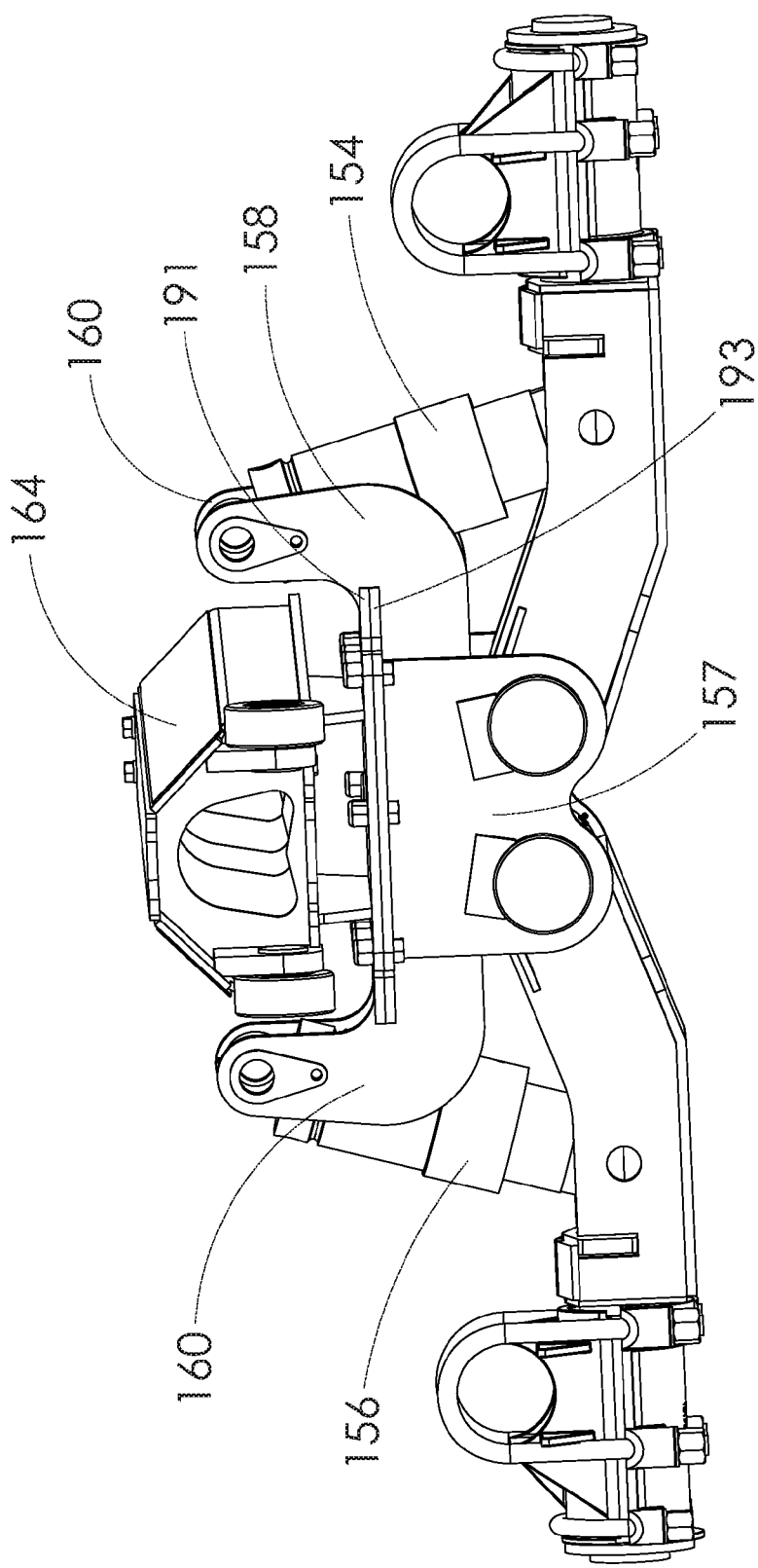
FIG. 13 is a slightly perspective view of the suspension of FIG. 12 further showing the rollers on the mounting beam structure of the alternative embodiment.
Figure 14:
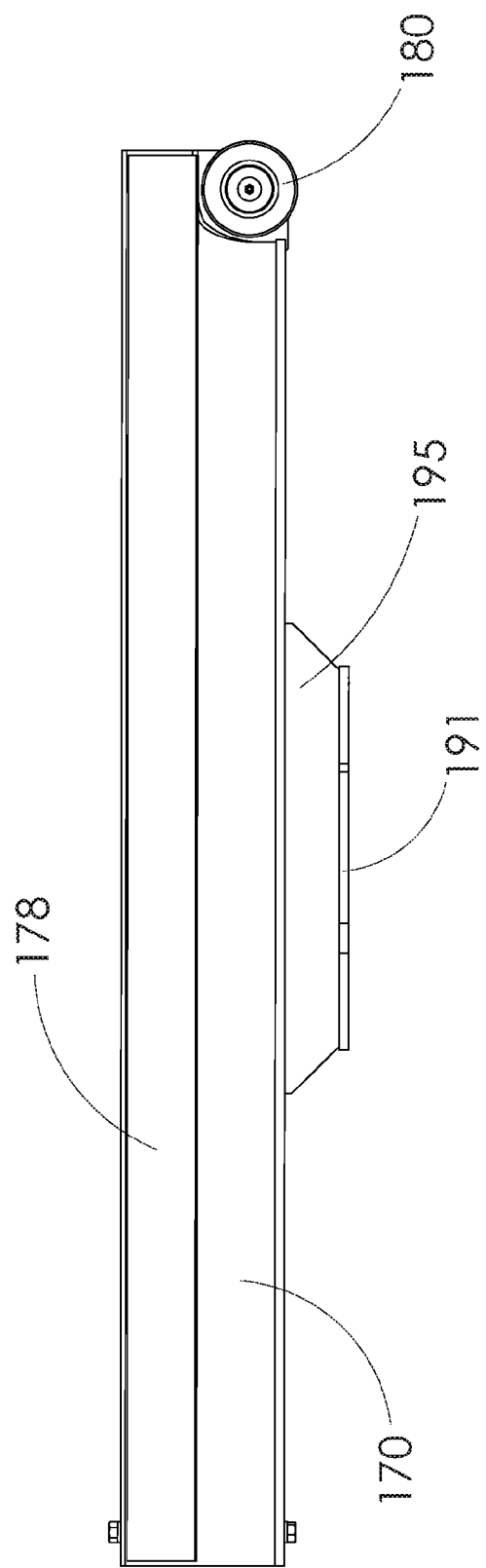
FIG. 14 is a side elevation of one of the mounting beam structures of the alternative embodiment.
Figure 15:
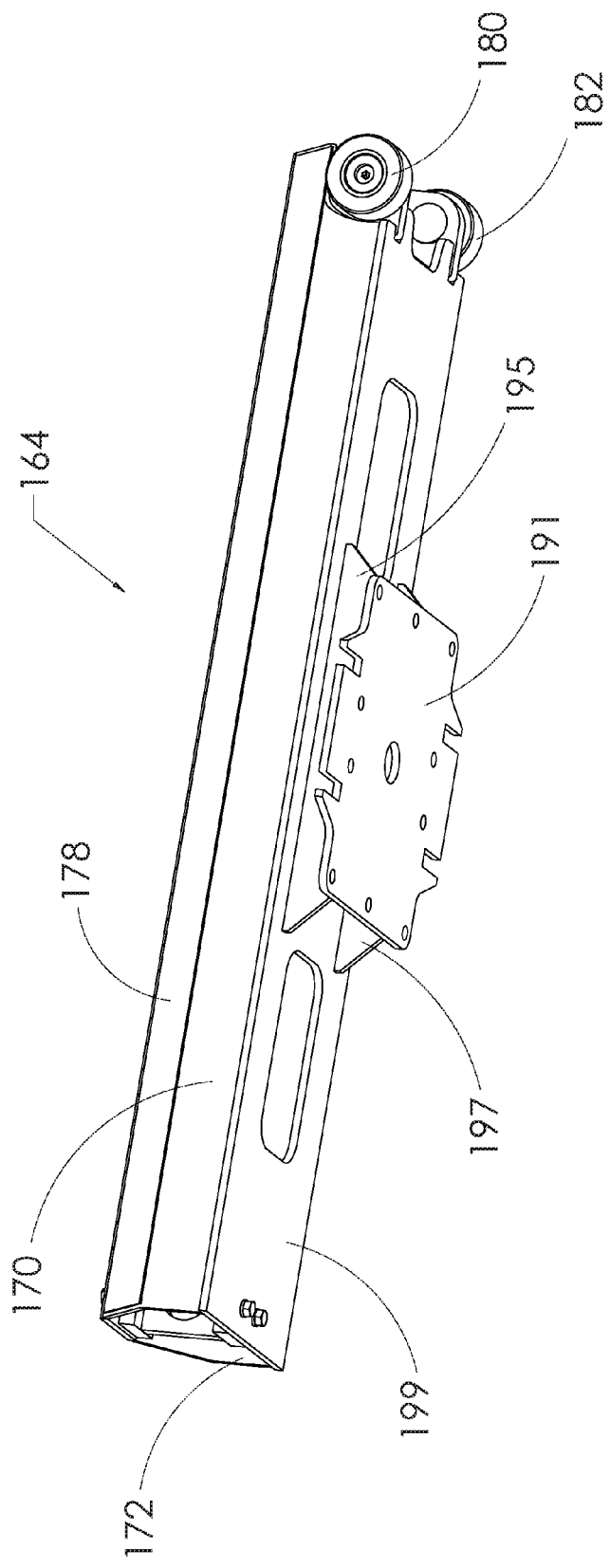
FIG. 15 is a bottom perspective view of the mounting beam structure of FIG. 14.
Figure 16:
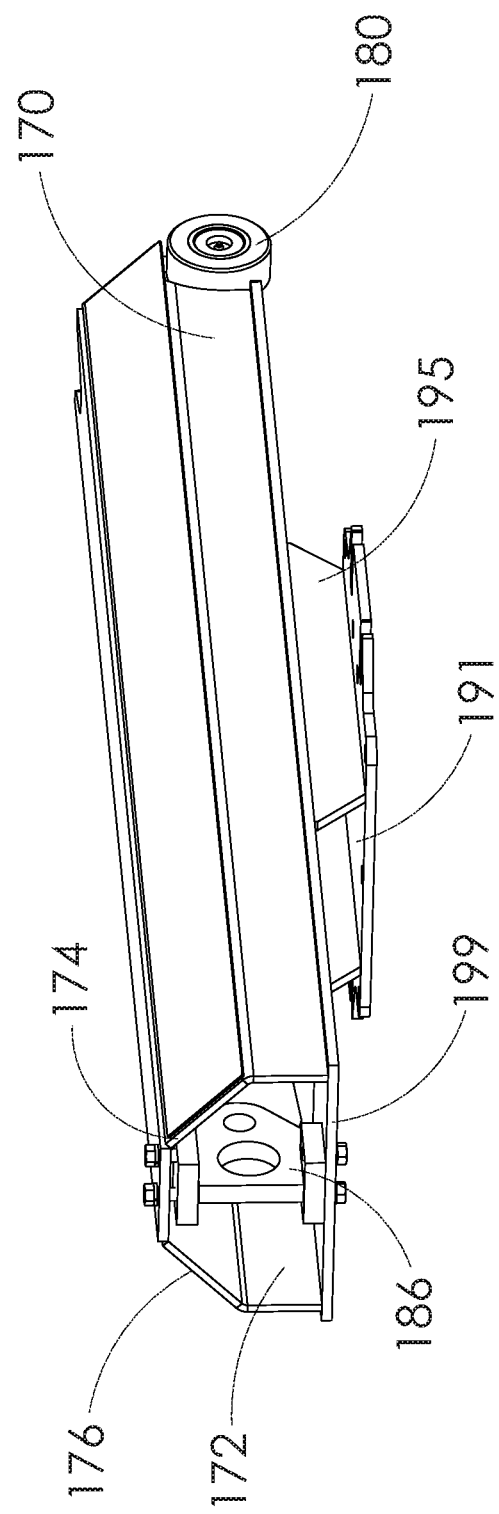
FIG. 16 is an end perspective view of the mounting beam structure of FIG. 14.

Referring to FIG. 12, front and rear cylinders 154, 156 are each attached between parallel cylinder lug brackets 158, 160 but that have a different shape than the cylinder lug brackets 97, 99 shown in the embodiment of FIG. 3. In the present embodiment, the lug brackets 158, 160 have a U-shape that allows the lug brackets 158, 160 to clear the mounting beam structures and the slide box assembly 184 which extend between the upper ends of lug brackets 158, 160 as best appreciated by reference to FIG. 12. Such arrangement allows the unitized suspension system and the mounting beam structure that it depends from, to slide along the slide box assembly 184 without interference by the lug brackets.

As in the preferred embodiment, the lug brackets are integrated into the hanger structure 157 which forms a rigid structure providing opposed points of attachment 171, 173 to the top ends of the front and rear cylinders 154, 156.

Referring to FIGS. 13-16 the mounting beam structures 164, 166 are sufficiently elongated to span and properly support their respective unitized suspensions. A base plate 191 serves as an attachment surface to a corresponding support plate 193 of the hanger 157. The base plate 191 is attached by means of two gussets 195, 197 to an elongated base 199 of the mounting beam structure 164. Opposed side walls 170, 172 include angled shoulders 174, 176, each supporting an additional friction plate 178 (the opposing friction plate not being visible in these views). The inboard ends of the mounting beam structures include rollers 180, 182 for permitting the mounting beam structures to slide along the slide box assembly 184.

A cylinder piston mount 186 is provided at an outboard end of each of the beam structures 164, 166. As will be discussed below the piston of one of two back-to-back telescoping cylinders is secured to the piston mount.

Figure 17:
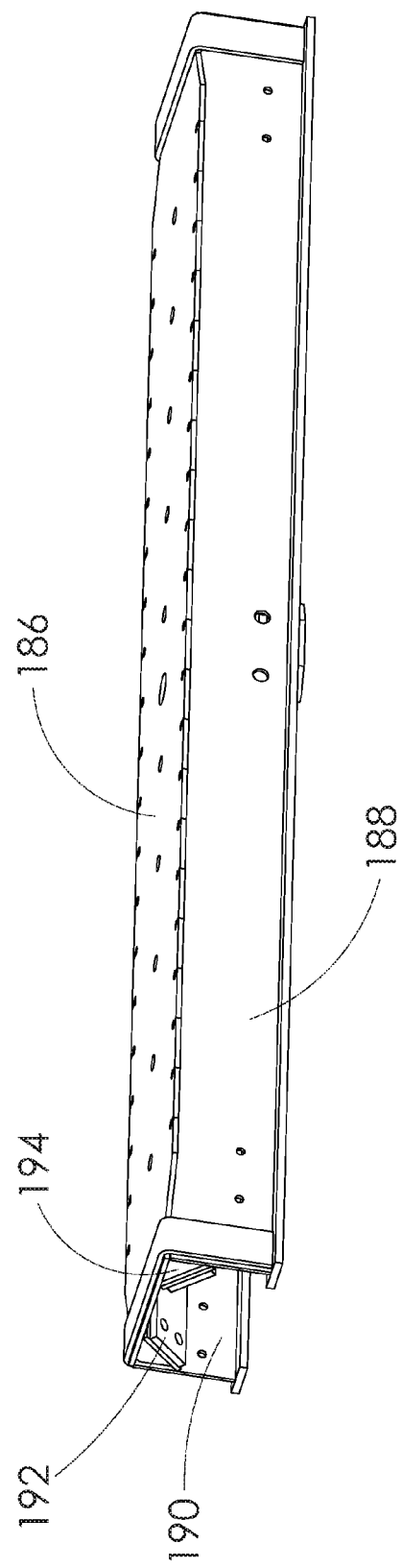
FIG. 17 is a perspective view of the slide box assembly of the alternative embodiment.
Figure 18:
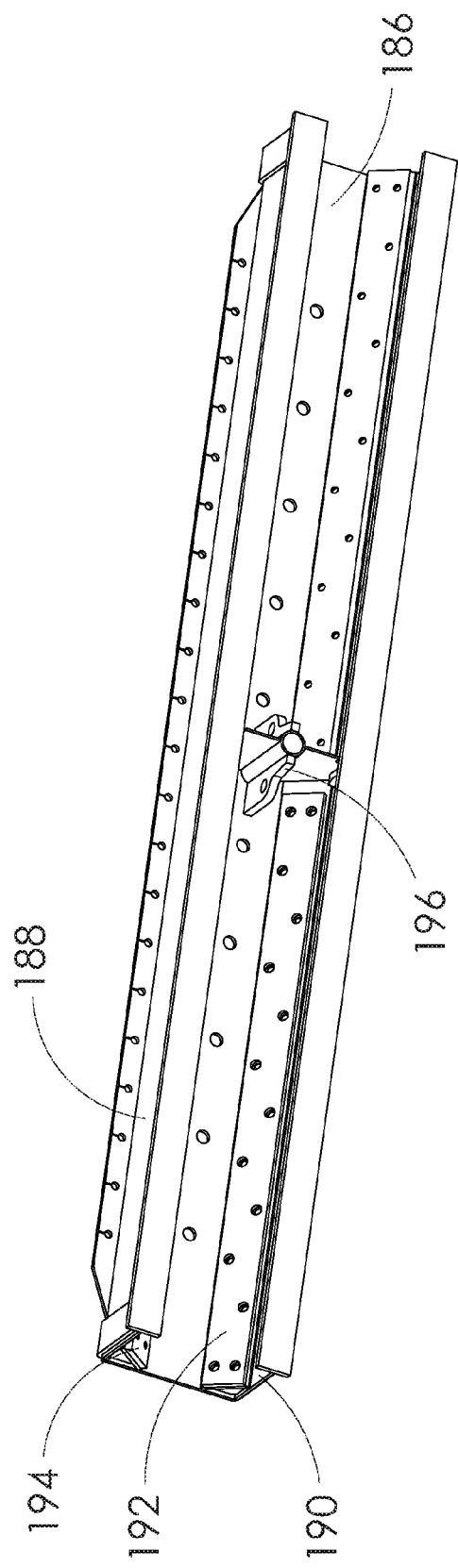
FIG. 18 is a bottom perspective view of the slide box assembly of FIG. 17.

The mounting beam structures 164, 166 are adapted to slide along a connecting slide box assembly 184 which is shown in isolated views in FIGS. 17 and 18. The slide box assembly 184 comprises a top wall 186, two side walls 188, 190 and angled corners walls 192, 194, each of which is in a sliding relationship with the corresponding walls of the mounting beam structures 164, 166. Slide box assembly 184 further comprises a center gusset 196 for retaining one end of each of two telescoping cylinders 198, 200.

Figure 19:
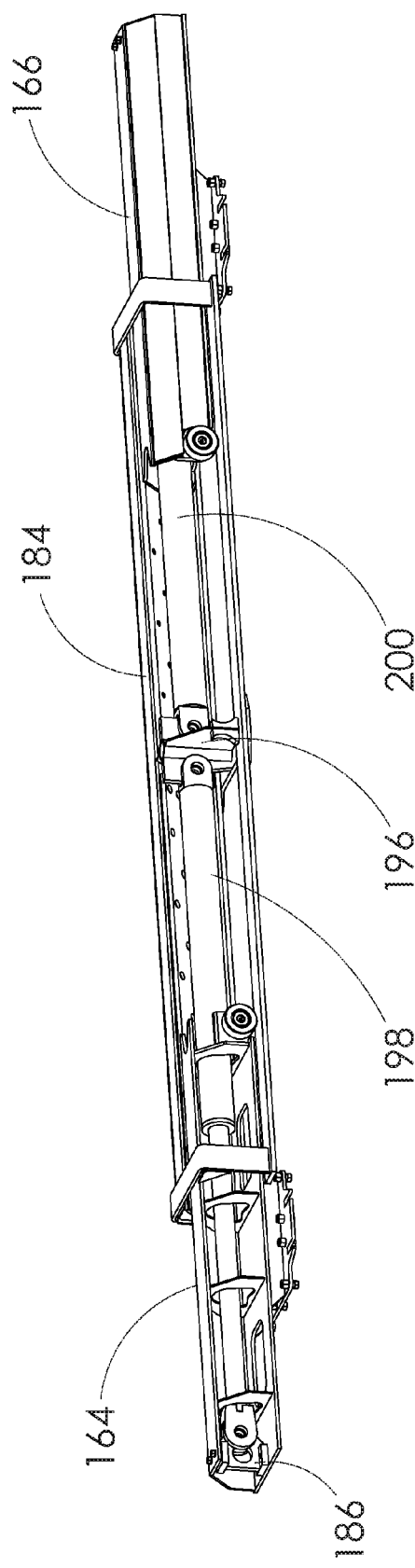
FIG. 19 is a side perspective view of the slide box assembly, the two mounting beam structures and the telescoping cylinders of the alternative embodiment, with the viewing sides of the slide box assembly and of one of the mounting beam structures omitted.

FIG. 19 shows the slide box assembly 184, the two mounting beam structures 164, 166 and including two telescoping cylinders 198, 200. In FIG. 19, the viewing side of the slide box assembly and of one of the mounting beam structures have been removed.

When actuated, the telescoping cylinders 198, 200 act to retract and extend the mounting beam structures 164, 166 along the slide box assembly 184, thereby retracting or extending the unitized suspension systems that are mounted to the mounting beam structures 164, 166 in relation to one another to facilitate dual lane loading. Each of cylinders 198, 200 is attached at one end to the central gusset 196 of the slide box assembly and at the other end to the piston mounts 186.

Figure 20:
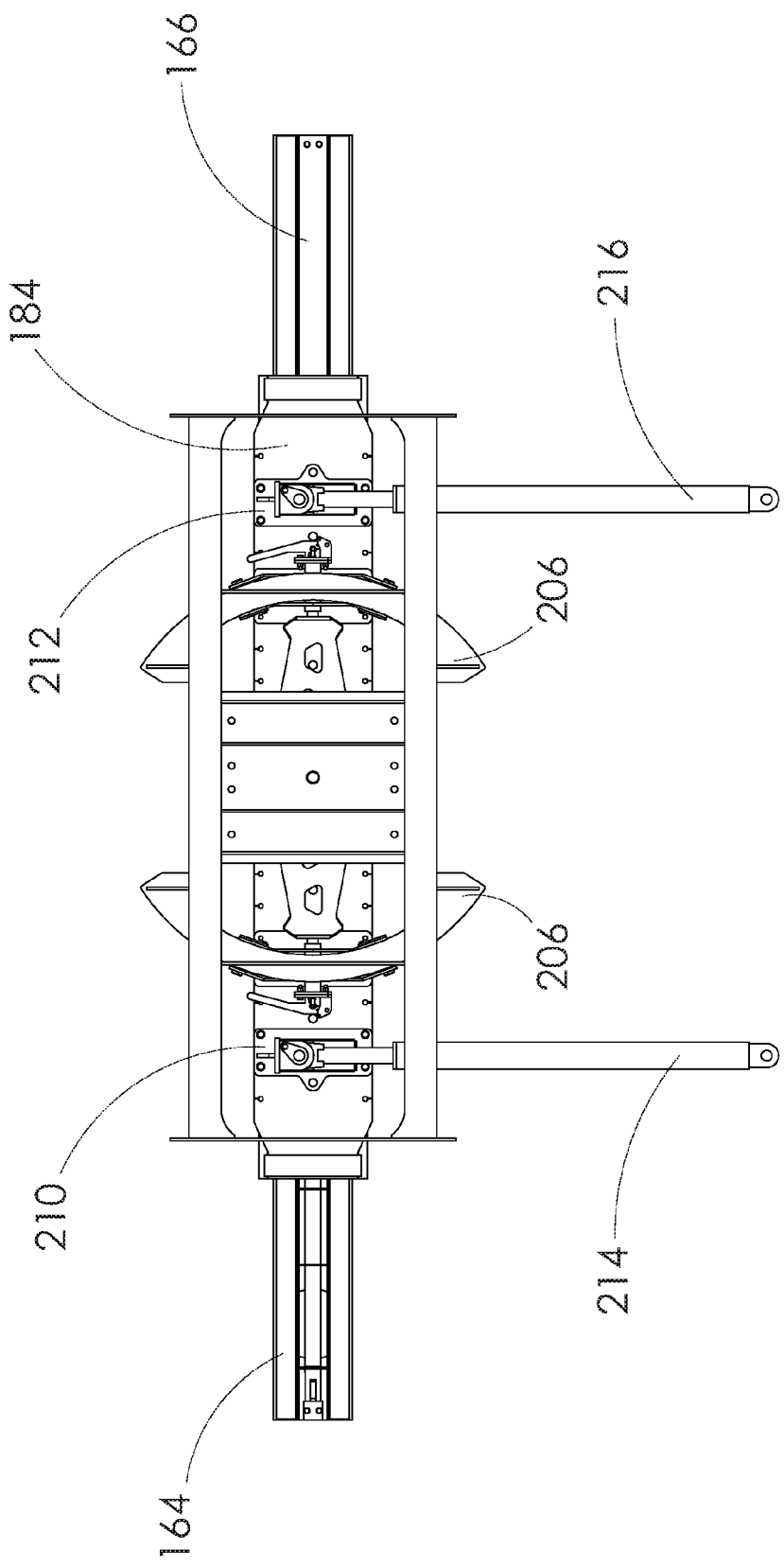
FIG. 20 is a top view of the slide box assembly, the mounting beam structures, the turntable and the coupler of the alternative embodiment; and, FIG. 21 is a front view of the structures of FIG. 20.
Figure 21:
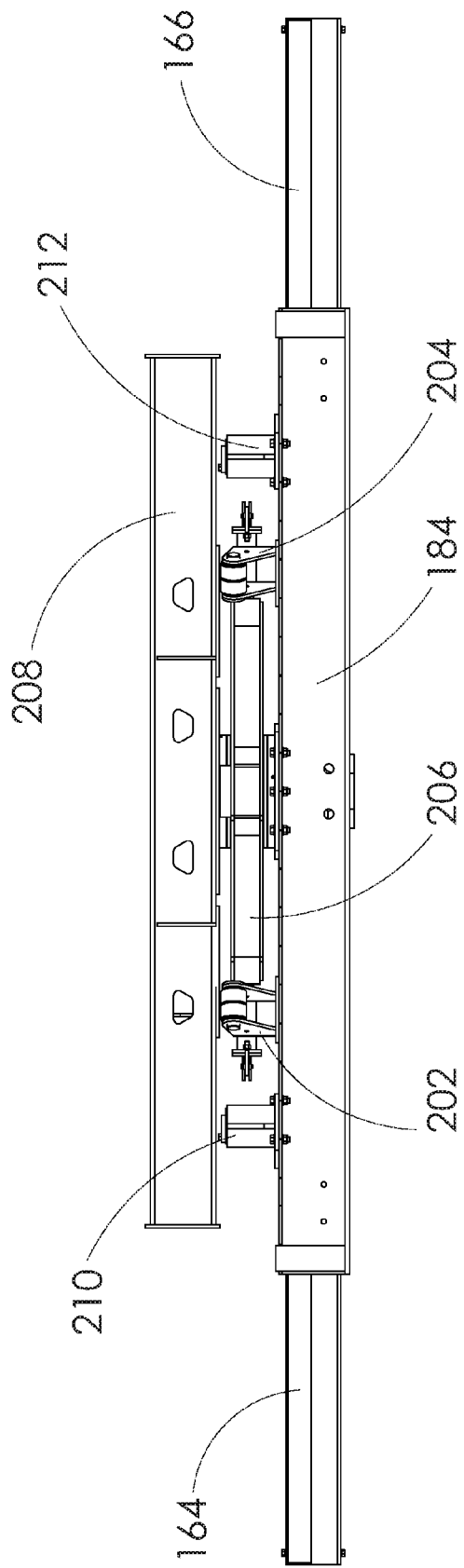

FIGS. 20 and 21 show the slide box assembly 184, the two mounting beam structures 164, 166 and a turntable system for enabling the coordinated turning of the 16-wheel assembly.

Two roller assemblies 202, 204 are mounted to the top of the slide box assembly 184. The slide box assembly 184 is pivoted about a turntable or steering arm 206 by means of a central bolt (not visible in these views). The turntable is supported from a coupler structure 208 that is mounted to the frame of the vehicle. Cylinder mounts 210 and 212 are provided on the upper surface of the slide box assembly 184 for attaching one end of respective cylinders 214, 216 for actuating steering of the 16-wheel assembly. In doing so, the rollers 202, 204 roll against the turntable rolling surfaces to effect steering of the assembly.

The use of the unitized hydraulic suspensions of the preferred embodiment simplify the successful implementation of a dual laning heavy haul hydraulic suspension trailer by minimizing the number of separate suspensions that need to be extended or retracted in a coordinated manner or that need to be steered in a coordinated manner. Rather than needing to extend or retract four independently suspended axles, only two unitized independent suspensions need to translated in relation to one another.

In the foregoing specification, the invention has been described with reference to specific embodiments thereof. However, the scope of the claims should not be limited by the preferred embodiments set forth in the examples, but should be given the broadest interpretation consistent with the description as a whole. The specification and drawings are, accordingly, to be regarded in an illustrative rather than a restrictive sense.

The invention claimed is:

1. A dual laning hydraulic suspension system comprising:
   at least two side by side tandem hydraulic suspension systems, each of said tandem hydraulic suspension systems comprising two pivoting axle support arms arranged on opposite front and rear sides of a common hanger, a first hydraulic cylinder attached between said common hanger and a first one of said support arms and a second hydraulic cylinder attached between said common hanger and a second one of said support arms;

each of said at least two tandem hydraulic suspension systems being mounted in slidable relationship to a slide assembly on the frame of a vehicle to allow said at least two tandem hydraulic suspension systems to be selectively repositioned in a retracted or an extended relationship to one another by sliding said tandem hydraulic suspension systems along said slide assembly transversely in relation to said frame.

2. The dual laning hydraulic suspension system of claim 1 wherein each of said at least two tandem hydraulic suspension systems is mounted to a mounting beam structure, said slide assembly comprises a slide box assembly and said mounting beam structure is engaged within said slide box assembly, and further comprising at least one hydraulic cylinder for actuating sliding movement of said mounting beam structure in relation to said slide box assembly.

3. A dual laning hydraulic suspension system comprising:

at least two side by side tandem hydraulic suspension systems, each of said tandem hydraulic suspension systems comprising two pivoting axle support arms arranged on opposite front and rear sides of a common hanger, a first hydraulic cylinder attached between said common hanger and a first one of said support arms and a second hydraulic cylinder attached between said common hanger and a second one of said support arms; and said side by side tandem hydraulic suspension systems being slidably mounted for transverse displacement in relation to one another.

4. The dual laning suspension system of claim 3 further comprising a slide assembly along which said hydraulic suspension systems are adapted to slide, said slide assembly being mounted to a turntable for pivoting within a horizontal plane.

\* \* \* \* \*